UNITED STATES PATENT OFFICE.

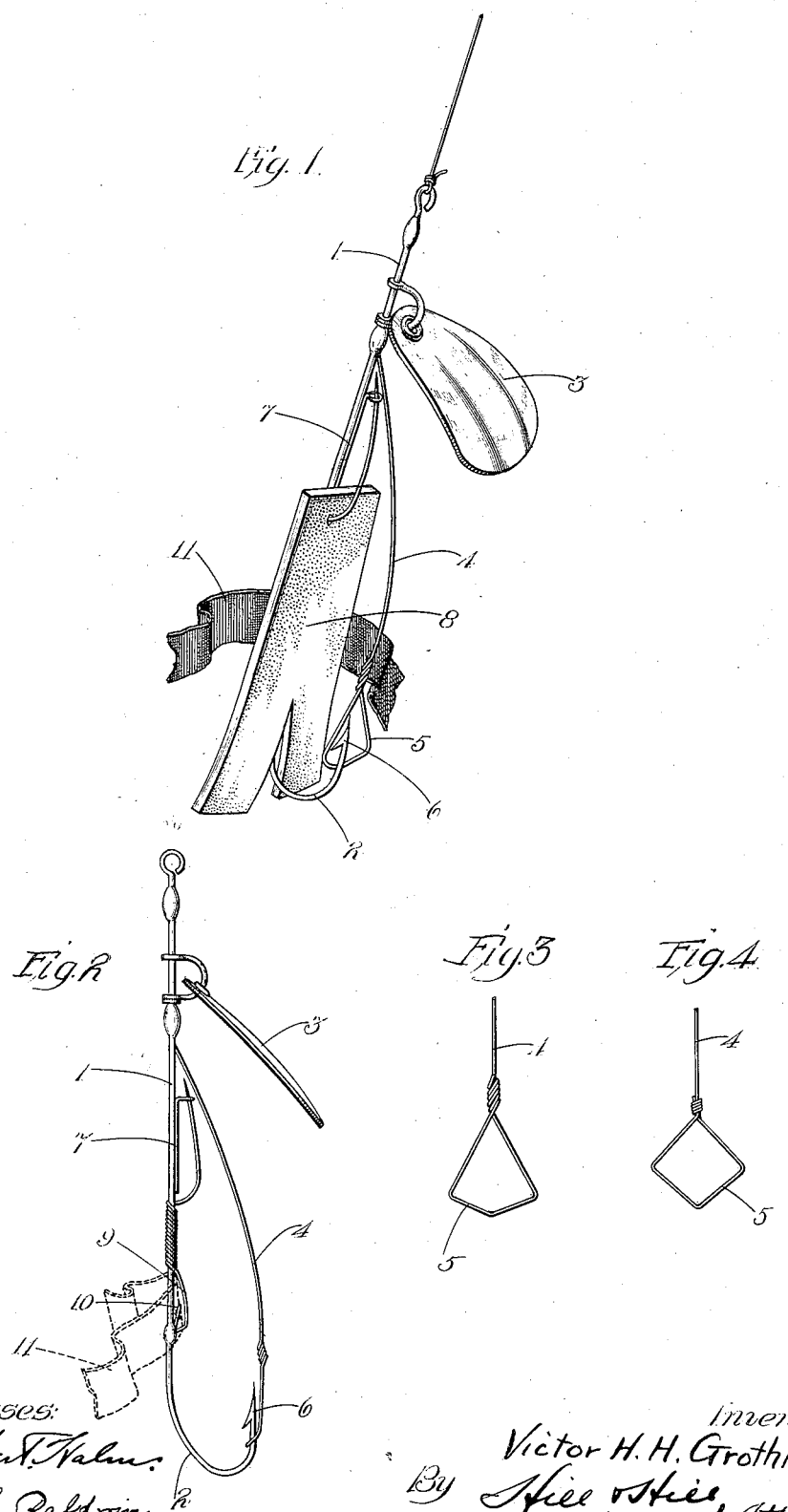

VICTOR H. H. GROTHKOPF, OF CHICAGO, ILLINOIS, ASSIGNOR OF ONE-THIRD TO FRANK JONAS, OF CHICAGO, ILLINOIS.

FISHING APPARATUS.

1,258,213.      Specification of Letters Patent.      Patented Mar. 5, 1918.

Application filed August 6, 1914. Serial No. 855,387.

*To all whom it may concern:*

Be it known that I, VICTOR H. H. GROTHKOPF, a citizen of the United States of America, residing at Chicago, in the county of Cook and State of Illinois, have invented certain new and useful Improvements in Fishing Apparatus, of which the following is a description.

My invention belongs to that general class of fishing apparatus employed in trolling or casting, sometimes called a trolling or casting hook. It has for its object an attractive lure combined with improved means for insuring the hooking of the fish which may strike at the lure.

To this end my invention consists in the novel construction, arrangement and combination of parts herein shown and described, and more particularly pointed out in the claims.

In the drawings, wherein like reference characters indicate like or corresponding parts, Figure 1 is a perspective view of my improved lure;

Fig. 2 is an edge view of the same, and

Figs. 3 and 4 show the free end of the weed or grass guards.

In the drawings, 1 indicates the usual shank terminating in the hook 2. The connection with the shank may be made with the well known form of swivel, if desired (not shown). The device may be provided with the usual spinner 3, arranged to rotate about the shank 1 by the movement of the device as drawn through the water. 4 is a weed or grass guard firmly attached to the shaft 1 near the loop end thereof, and extending downward with the loop 5 positioned beneath the barb 6 of the hook, and resiliently maintained in that position by the spring in the guard particularly constructed for that purpose. 7 is an engaging device attached to the shank of the hook, which is preferably in the form of a safety pin secured thereon, and which is formed to engage with a bait of pork rind 8, or equivalent material, and then be locked, as shown, to prevent its accidental disenagagement. In the form shown the engaging means 7 is substantially in the form of a safety pin, rendering it convenient to engage and disengage the pork rind 8 therefrom.

For the purpose of adding a dash of color to the lure, it is common to attach a piece of red flannel or similar material to the lure, and for this purpose I provide a second engaging means 9, also secured to the shank of the hook, and preferably in the form of a closed loop with an additional or supplemental engaging point 10 extending substantially therein, upon which the piece of flannel or other material 11 may impinge after being threaded through the loop, and preventing its being drawn therefrom by the pull of the water thereon. The piece 11 may simply be threaded through the loop 9, impinging upon the part 10, as shown in Fig. 2, or it may be wrapped close around the shaft and impinge upon said part with the free ends extending on either side of the shank.

In using my device, I prefer that the pork rind 8 be of a length reaching substantially to the bend of the hook, as shown, or only slightly beyond, and in the preferred form it is cut in a forked form, as shown. As it is assembled substantially as shown in Fig. 1, the spinner with the dash of color from the part 11 and the pork rind 8, or equivalent material, extending to the end of the hook, forms a most fascinating lure, as practice has demonstrated. In striking at the lure, the fish strikes far enough on the hook to be engaged thereon, the weed guard yielding to the force of the strike. This obviates the difficulty met with where pork rind and flannel were used in combination with a spinner, and in which the rind and the flannel were engaged directly with the hook, and extending a considerable distance from the rear thereof. In the form mentioned above the fish might strike very vigorously, and yet not strike far enough on the lure to engage the hook. My device is intended to combine all the desirable features which have been demonstrated by practice in a manner that will insure the hooking of the fish upon striking at the lure.

Either of the forms of guard shown in Figs. 3 and 4 may be employed, the object being to insure the loop lying beneath the barb of the hook and bent upward on either side thereof in a manner that will protect the barb from engaging the weeds or grass.

Having thus described my invention, it is obvious that various immaterial modifications may be made in the same without departing from the spirit of my invention; hence I do not wish to be understood as lim- iting myself to the exact form, construction, arrangement and combination of parts herein shown and described, and more particularly pointed out in the claims.

Having thus described my invention, what I claim as new and desire to secure by Letters Patent is:

1. A fish hook of the kind described, comprising a suitable shank terminating in a barbed hook at one end, a wire twisted about and secured intermediate its ends to the shank, with the end adjacent the barb looped away from the shank, and thence again secured adjacent its end to the shank, but with the extreme end projecting into the space between the loop and shank, the opposite end of said wire looped outwardly from the shank and extending toward the free end of the shank, and means on the shank for engaging the said last mentioned end of said wire, whereby when bait is placed on the last mentioned loop and locked in place, the first mentioned loop in said wire will be intermediate the ends of the bait.

2. A fish hook of the kind described, comprising a suitable shank terminating in a barbed hook at one end, a wire twisted about and secured intermediate its ends to the shank, with the end adjacent the barb looped away from the shank, and thence again secured adjacent its end to the shank, but with the extreme end projecting into the space between the loop and shank, the opposite end of said wire looped outwardly from the shank and extending toward the free end of the shank, and means on the shank for engaging the said last mentioned end of said wire, whereby when bait is placed on the last mentioned loop and locked in place, the first mentioned loop in said wire will be intermediate the ends of the bait, and a second resilient wire for one end secured to the shank adjacent the free end thereof with the other end extending toward the hooked end and looped thereabout to engage therewith on the shank side thereof to constitute a bait guard, whereby the bait carried on the shank by said first wire is prevented from swinging outwardly from the shank beyond the barbed end of the hook.

In testimony whereof, I have hereunto signed my name in the presence of two subscribing witnesses.

VICTOR H. H. GROTHKOPF.

Witnesses:
 Roy W. Hill,
 L. M. Baldwin.